(12) United States Patent
Schmidt et al.

(10) Patent No.: US 9,939,265 B2
(45) Date of Patent: Apr. 10, 2018

(54) TRACKING METHOD AND TRACKING SYSTEM

(71) Applicant: Hilti Aktiengesellschaft, Schaan (LI)

(72) Inventors: Peer Schmidt, Lindau (DE); Dario Bralla, Buchs (CH); Serhey Khandozhko, Buchs SG (CH)

(73) Assignee: Hilti Aktiengesellschaft, Schaan (LI)

( * ) Notice: Subject to any disclaimer, the term of this patent is extended or adjusted under 35 U.S.C. 154(b) by 0 days.

(21) Appl. No.: 15/501,134

(22) PCT Filed: Jul. 29, 2015

(86) PCT No.: PCT/EP2015/067335
§ 371 (c)(1),
(2) Date: Feb. 1, 2017

(87) PCT Pub. No.: WO2016/016284
PCT Pub. Date: Feb. 4, 2016

(65) Prior Publication Data
US 2017/0227360 A1  Aug. 10, 2017

(30) Foreign Application Priority Data
Aug. 1, 2014  (EP) ..................................... 14179441

(51) Int. Cl.
*G01C 9/00* (2006.01)
*G01C 15/00* (2006.01)
(Continued)

(52) U.S. Cl.
CPC .......... *G01C 15/004* (2013.01); *G01B 11/002* (2013.01); *G01B 11/026* (2013.01);
(Continued)

(58) Field of Classification Search
CPC ....... G01B 11/00; G01B 11/14; G01B 11/002; G01B 11/026; G01B 11/25; G01C 15/002;
(Continued)

(56) References Cited

U.S. PATENT DOCUMENTS 5,771,978 A * 6/1998 Davidson ................ E02F 3/847
172/2
6,198,528 B1 * 3/2001 Maynard ................. G01S 7/003
342/457
(Continued)

FOREIGN PATENT DOCUMENTS

DE  10 2008 039 838 A1  3/2010
DE  10 2008 054 453 A1  6/2010

OTHER PUBLICATIONS

PCT/EP2015/067335, International Search Report dated Oct. 12, 2015, with partial English translation (Five (5) pages).
(Continued)

*Primary Examiner* — Michael P Stafira
(74) *Attorney, Agent, or Firm* — Crowell & Moring LLP

(57) ABSTRACT

A tracking method is disclosed. The method determines the position of a location marked on a wall on the basis of image coordinates of a first image point, image coordinates of a second image point, the emission direction associated with the second image point, and the respective distances of the axis of a base station from the wall in the associated emission direction.

13 Claims, 8 Drawing Sheets

(51) Int. Cl.
  *G01C 11/02* (2006.01)
  *G01C 1/04* (2006.01)
  *G01B 11/00* (2006.01)
  *G01B 11/25* (2006.01)
  *G01B 11/02* (2006.01)
  *G01S 17/06* (2006.01)

(52) U.S. Cl.
  CPC ............... *G01B 11/25* (2013.01); *G01C 1/04* (2013.01); *G01C 11/02* (2013.01); *G01C 15/002* (2013.01); *G01S 17/06* (2013.01)

(58) Field of Classification Search
  CPC ...... G01C 21/26; G01C 11/02; G01C 15/004; G01C 1/04; G01C 21/206; G01C 25/00; G01C 5/06
  See application file for complete search history.

(56) References Cited

U.S. PATENT DOCUMENTS

| | | | |
|---|---|---|---|
| 2003/0160757 A1 | 8/2003 | Shirai et al. | |
| 2006/0138225 A1* | 6/2006 | Richley | G06K 7/10009 235/385 |
| 2013/0096873 A1* | 4/2013 | Rosengaus | G01C 15/002 702/151 |
| 2016/0025489 A1* | 1/2016 | Klepsvik | G01S 17/42 356/5.01 |

OTHER PUBLICATIONS

U.S. Patent Application, "Tracking Method and Tracking System", filed Feb. 1, 2017, Inventor Peer Schmidt et al.

* cited by examiner

TRACKING METHOD AND TRACKING SYSTEM

This application claims the priority of International Application No. PCT/EP2015/067335, filed Jul. 29, 2015, and European Patent Document No. 14179441.2, filed Aug. 1, 2014, the disclosures of which are expressly incorporated by reference herein.

BACKGROUND AND SUMMARY OF THE INVENTION

The present invention relates to a tracking method, which is set up for measuring a position on a wall.

A tracking method determines the position of a location marked on a wall using the following steps. The marked location is recorded in a first image with a camera, oriented in a viewing direction, of a mobile measuring station. The image coordinates of a first image point, on which the marked location is imaged in the first image, are determined. A bundle having at least one light beam is intrinsically rotated or swiveled about at least one axis of the base station according to a predefined sequence of changing emission directions to generate a migrating pattern of points of light on a wall of the interior space. A series of images of the wall is recorded under the viewing direction, wherein in the series on at least a second image point, there is imaged one of the migrating points of light. The image coordinates of at least a second image point are determined. The emission directions of the light beams, whose points of light are imaged at a point in time in one of the images on at least one second image point, are determined based on the instants at which the respective image is recorded. The distance of the axis of the base station to the wall in the emission directions is determined based on distance measurements to the wall, stored in a reference database, in measuring directions originating from the base station. The position of the marked location is determined based on the image coordinates of the first image point, the image coordinates of the second image points, the emission direction associated with the second image points, and the respective distances of the axis of the base station to the wall in the associated emission direction.

The bundle may consist of exactly one light beam or multiple light beams arranged in constant angular distances to each other. The series may comprise one or multiple images, which are characterized by the same viewing direction. For a series of different images, one can image the point of light of a light beam on various image points or one can image points of light of various light beams on the various image points.

One design provides that a first one of the images from the series is taken at a first instant and a second one of the images from the series is taken at a second instant different from the first instant. The first instant can be adaptively adjusted to image one of the points of light of the migrating pattern on an image point at the edge of the image, and the second instant is adaptively adjusted to image one of the points of light of the migrating pattern on an image point at another edge of the image.

The distance measurements in the measurement directions occur preferably with a measuring light beam of an optical distance measuring unit. The tracking method may have an initialization phase that is separate from a tracking phase. During the initialization phase, at least one measuring light beam is rotated or swiveled about at least one axis in measuring directions that change according to a predefined sequence. The respective distance of the axis to the wall in the measuring directions is measured based on a duration and/or interference measurement of the measuring light beam. The measuring directions and associated measured distances may be stored in a reference database. During the tracking phase, the distance in an emission direction of the light beam is determined by means of a measuring direction corresponding to the emission direction in the reference database or a mean value of the stored distances weighted according to the respective differences of the stored measurement directions to the emission direction.

One design provides that during the initialization phase, the measuring light beam is rotated or swiveled at a first angular velocity, and during the tracking phase, the bundle of light beams is rotated or swiveled at a second angular velocity, wherein the second angular velocity is greater than the first angular velocity.

One design provides that the sequence according to which the bundle with at least one light beam is rotated or swiveled is identical to the sequence according to which the measuring light beam is rotated or swiveled.

One design provides that the bundle is rotated or swiveled about precisely one axis and the bundle has at least two light beams, which are angled to each other at an angle in a plane containing the axis. The base station moves the bundle about a vertical axis for example, and through the movement and instants, it achieves a horizontal resolution. The vertical resolution is obtained by the resolution of the light beams in various elevation angles. The vertical resolution is limited by the number of light beams and significantly less than the resolution, limited by the time measurements, in the horizontal plane. However, the structures of typical interior spaces exhibit comparatively fewer changes along the vertical direction in comparison to the horizontal directions.

BRIEF DESCRIPTION OF THE DRAWINGS

The following description describes the invention by means of illustrative embodiments and drawings.

DETAILED DESCRIPTION OF THE DRAWINGS

Figure 1:
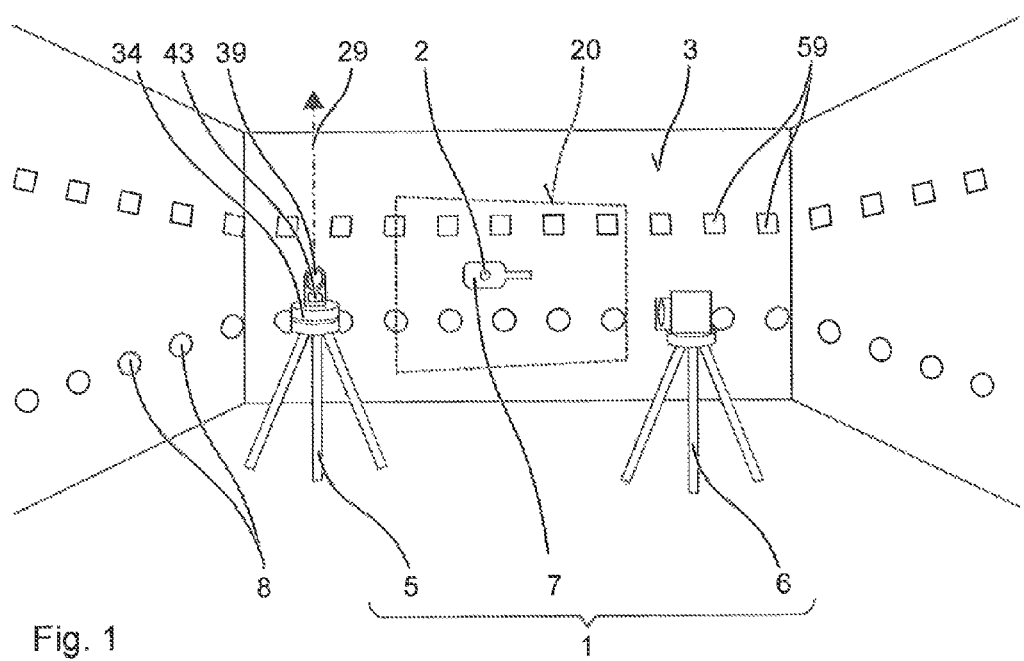
FIG. 1 illustrates a tracking system.
Figure 2:
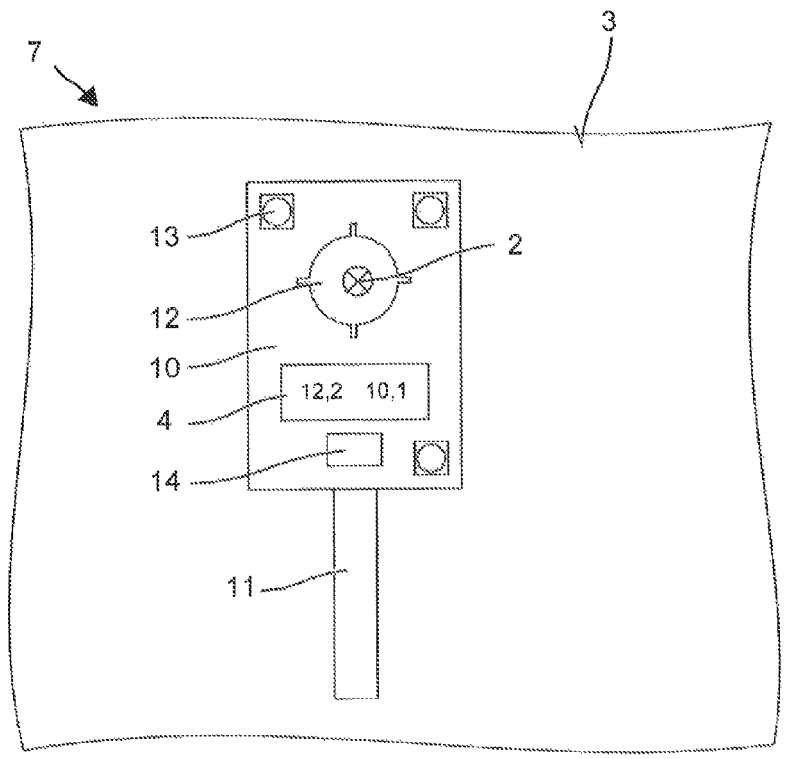
FIG. 2 shows a marker of the tracking system.

Unless indicated otherwise, identical or functionally identical elements are labeled with the same reference signs in the drawings.

A tracking, system 1 can be used to measure the position of a location 2 on a wall 3. One application provides for informing the user of the spatial coordinates of location 2 by means of a display 4. The position can, for example, be indicated in relation to the location of a base station 5 of tracking system 1 or in relation to a previously marked location 2 on wall 3. Another application provides for marking a position, in a floorplan, associated with marked position 2 on wall 3. In a continuation, the floorplan about marked location 2 is projected directly on wall 3. Wall 3 is representative of all interior surfaces of a building, particularly of the ceiling surfaces and the floor, and also moveable elements enclosing the interior space, such as doors, windows, and so on.

Illustrative tracking system 1 of FIG. 1 comprises a stationary base station 5, a mobile measuring station 6, and a marker 7. Using marker 7, the user can mark any location 2 on a wall 3. At one instant, mobile measuring station 6 records the relative position of marked location 2 in relation to a moving point of light 8, which stationary base station 5 projects on to wall 3. Stationary base station 5 determines the absolute position captured at that instant by point of light 8 on wall 3; from said absolute position, one can determine the absolute position of marked location 2 in the coordinate system of base station 5.

Illustrative tracking system 1 can determine the position of mobile measuring station 6 in the interior space relative to base station 5. To do so, mobile measuring station 6 records in a brief timespan the moved point of light 8 at three or more different locations on wall 3 in an image 9. The point of time or points of time at which points of light 8 are recorded is/are used to query base station 5 for the coordinates of the respective locations of point of light 8 on wall 3. A triangulation of the locations based on image 9 provides the position of mobile measuring station 6.

Marker 7 may be for example a plate 10 with a handle 11, which the user physically holds at wall 3. Plate 10 has a small viewing hole 12, which the user positions at location 2 on wall 3. On plate 10, there are optical position marks 13. Position mark 13 may be formed for example by multiple light diodes arranged in a pattern. Furthermore, marker 7 may have a display 4 and multiple operating elements 14, e.g., buttons. The user may request a position identification of marker 7 via operating element 14. The current position is shown in display 4. Furthermore, the current position can be established as the origin of a base coordinate system 15; distance measurements for two locations 2 on wall 3 can hereby be performed in a simple manner.

An alternative marker is based on a handheld light pointer, e.g., a laser pointer. The user points to the location to be identified with the light pointer. The position mark on the marker is thus the light marker generated by the light pointer on the wall. The marker can also be equipped with a display and operating elements.

Figure 3:
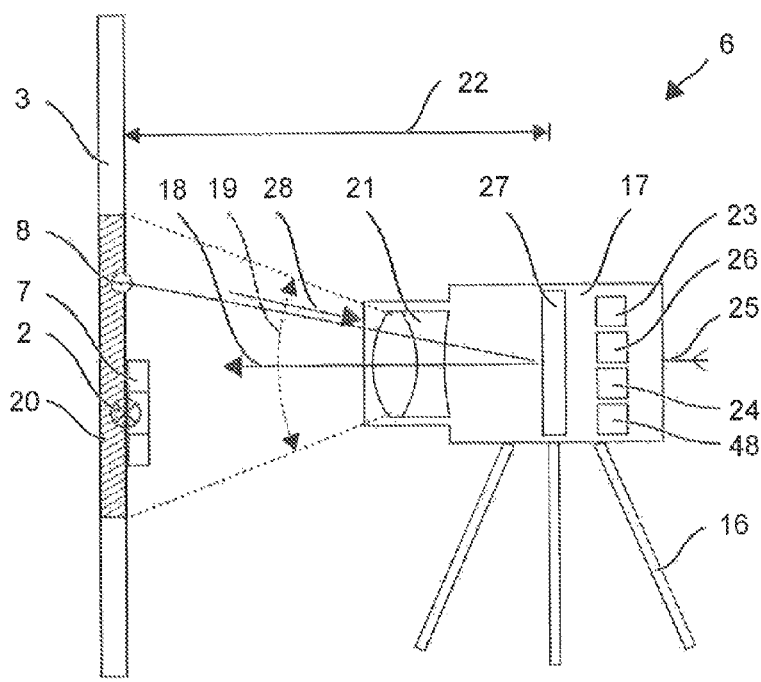
FIG. 3 shows a mobile measuring station.

Mobile measuring station 6 may be set up on a tripod 16 in the space (FIG. 3). The location preferably differs from the location of base station 5 (FIG. 1). Mobile measuring station 6 has a camera 17, which in viewing direction 18 records images 9 of wall 3. Viewing direction 18 is coaxial to the optical axis of camera 17. Visual field 19 of camera 17 defines wall section 20, which is visible for tracking system 1 and in which position mark 13 of marker 7 is captured by tracking system 1. Wall section 20 must be passed through by point of light 8. Point of light 8 may periodically enter into and exit out of visual field 19 of camera 17. The user influences the size of visual field 19 and thus visible wall section 20 in a known manner by means of lens 21 of camera 17 and distance 22 of camera 17 to wall 3. Given a tripod 16, one can generally assume a largely horizontally oriented camera 17. As an alternative to a fixed location, camera 17 may be carried along by the user, e.g., mounted on a helmet. Due to the entirely unknown orientation of mobile measuring station 6 and its camera 17, more measured information is hereby necessary to determine positions on wall 3 and in the interior space. The tracking methods described hereafter require in some cases multiple images 9 of wall section 20. Viewing direction 18, i.e., wall section 20, must be the same for consecutive images 9. Since images 9 can be taken consecutively in fractions of a second, typical movements of a handheld measuring station 6 or an arrangement on a helmet are not problematic.

Provided that the user has correctly set up mobile measuring station 6, point of light 8 is at least temporarily present in visual field 19 of camera 17. Typically, as will still become evident from the description of base station 5, point of light 8 is mostly outside of visual field 19, yet enters into it periodically and at the same location. Camera 17 continuously records images 9 of wall section 20. Camera 17 has a trigger 23, which establishes the instant for recording an image 9. Trigger 23 may record an image 9 every 10 ms, for example, by means of an internal fixed clock generator 24 of measurement station 6. The instant at which trigger 23 was actuated and an image 9 is recorded is either captured or can be determined afterwards in an appropriate manner. Trigger 23 may also be equipped with a controller, which estimates a point in time for the next appearance of point of light 8 in visual field 19 and triggers at that instant. Another design provides that trigger 23 is remotely actuated from base station 5 via a radio interface 25.

Figure 4:
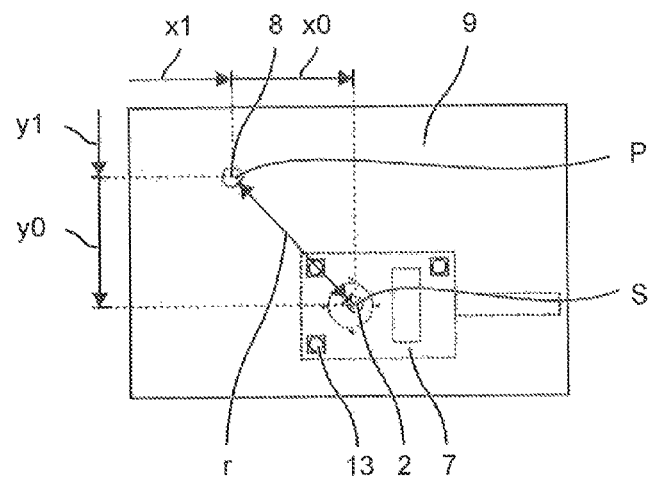
FIG. 4 shows an image recorded by the measuring station.

Point of light 8 is imaged in some of the images 9 on an image point P (FIG. 4). An image analysis unit 26 determines whether point of light 8 is imaged in an image 9. Point of light 8 is characterized by its high brightness level compared to the environment, its specific color, and small size compared to typical structures in wall section 20. An image analysis unit 26 uses a color filter for example to suppress colors other than the specific one; a contrast filter largely suppresses similarly illuminated surfaces. The image points of filtered image 9 are compared against a threshold value. An image point P exceeding the threshold value is associated with point of light 8. Images 9 without point of light 8 and associated data can be discarded.

In images 9 and using point of light 8, image analysis unit 26 can determine image coordinates x1, y1 of image point P. The image coordinates are indicated for example by row and column of image point P in the typically rasterized image 9. The raster corresponds for example to the grid arrangement of light-sensitive cells of a CCD chip 27. A higher resolution of image coordinates x1, y1 can be achieved by analyzing the intensity distribution of neighboring image points.

Image point P and image coordinates x1, y1 provide a (recording) direction 28, under which camera 17 sees point of light 8 at that instant. The determination of image coordinates x1, y1 references point of light 8 in a camera-based coordinate system or coordinate system of mobile measuring station 6.

In image 9, image analysis unit 26 detects position marks 13 of marker 7. The preferably luminous position mark 13 can be accentuated, on the basis of its color, shape, etc., by means of corresponding filters. The image coordinates of position marks 13 are determined. Based on the known arrangement of position marks 13, image coordinates x0, y0 of viewing hole 12 and thus location 2 marked with viewing hole 12 can be calculated. Alternatively, image coordinates x0, y0 of marked location 2 can be determined directly, for example for a marked location 2 accentuated by the light pointer.

Image analysis unit 26 can be implemented in mobile measuring station 6. The implementation may be implemented by a routine executed by a microprocessor.

Figure 5:
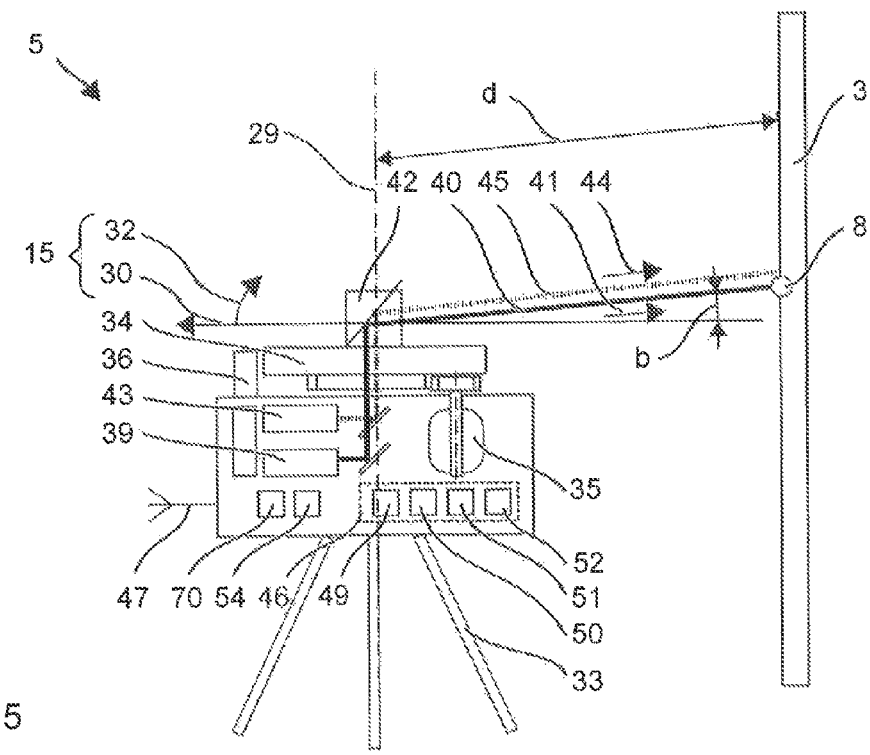
FIGS. 5 and 6 show a base station.
Figure 6:
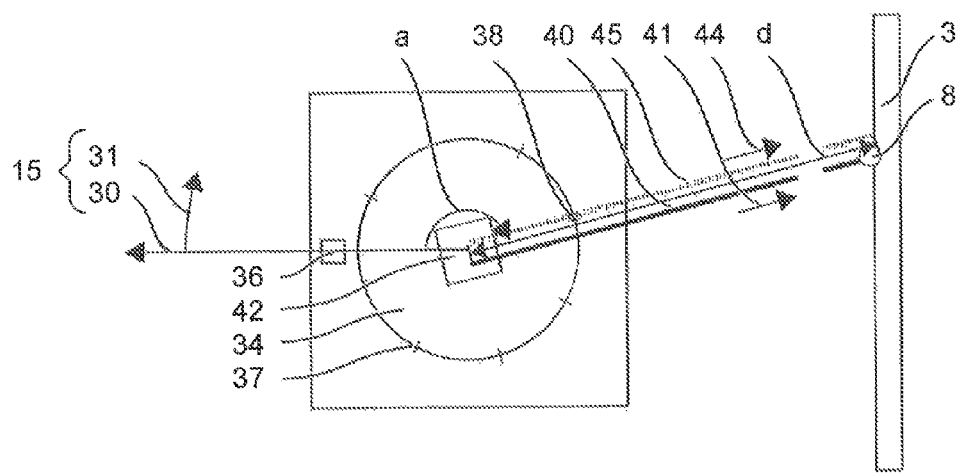

Base station 5 is set up at a fixed location. An illustrative base station 5 is depicted in FIG. 5 in a side view and in FIG. 6 in a top view. Base station 5 defines a coordinate system for tracking system 1, which is labeled hereafter as base coordinate system 15. Base coordinate system 15 can be compared with a primary coordinate system, e.g., a floor plan. For example, the location is measured and manually entered by the user. Alternatively, the user can hold marker 7 at a reference location on wall 3, have this reference location measured by tracking system 1, and establish said reference location as the origin of base coordinate system 15. Additional calibration methods are possible. Below, for a simpler description, the origin of base coordinate system is set to the location of base station 5, an axis 29 of base coordinate system 15 is vertical, i.e., parallel to the force of gravity, and a zero direction 30 of base coordinate system 15 points in the horizontal plane toward a known cardinal direction, e.g., north. The base coordinates are hereafter described as spherical coordinates with a horizontal angle direction 31, a vertical angle direction 32, and a distance to the origin, i.e., the location of base station 5.

Base station 5 has a tripod 33. Tripod 33 serves to set up base station 5 in a stable manner. The depicted tripod 33 is suited particularly for being set up in a simple manner on uneven ground. Other constructions with only one stand, more than three legs, etc. may also be appropriate.

Base station 5 has on tripod 33 a swivel head 34, which can be rotated or swiveled about an axis 29 or two axes. The orientation of swivel head 34 is described by an angle for a moveable axis or two angles for two moveable axes. For meteorological reasons, it is appropriate to determine the angles respectively in the plane perpendicular to the axes with respect to zero direction 30. The illustratively depicted swivel head 34 is a rotating plate, which is only rotatable about vertical axis 29. The orientation has a fixed elevation angle b equal to zero and a changing horizontal angle a. Illustrative swivel head 34 turns in one direction of rotation about axis 29. In other designs or also in a setup of base station 5, swivel head 34 can periodically swivel back and forth about axis 29 between two angle limits, e.g., by 90 degrees.

A controlled drive 35 turns or swivels swivel head 34. Drive 35 contains for example an electric motor and a gear unit. Swivel head 34 has an encoder 36, which determines the orientation of swivel head 34 in base coordinate system 15. Given a single-axis swivel head 34, encoder 36 records one angle; for a two-axis swivel head, encoder 36 calculates two angles to determine the orientation. Encoder 36 may be executed in various constructions. Examples are an angle sensor, a magnetic incremental rotary encoder, an optically scanned punched disk, an inductively scanned ring with periodically repeating scale marks 37, and so on. Another example of an encoder is based on a revolution-regulated motor and a timer, which calculates the angle from the revolutions and the time. Encoder 36 is calibrated with zero direction 30. The calibration of encoder 36 may be repeated with every revolution of swivel head 34, e.g., a special mark 38 is applied on rotating disk 34 for zero direction 30.

Base station 5 has a light beam source 39. Light beam source 39 generates a low-divergence collimated light beam 40. Light beam source 39 is preferably a laser light source, e.g., having a laser diode. Light beam 40 draws point of light 8 on wall 3. Point of light 8 is sufficiently small, e.g., having a diameter of less than 3 mm, to ensure sufficient spatial resolution. The shape of point of light 8 is typically circular or elliptical. By means of suitable optics, e.g., diffraction gratings, a different shape can be assigned to the cross-section of light beam 40 and thus point of light 8, e.g., rhombus-shaped, cross-shaped, or ring-shaped. Preferably, point of light 8 is invisible in the infrared range.

Emission direction 41 of light beam 40 is established by swivel head 34. For the sake of simplifying the geometry, light beam 40 is described as originating from axis 29. Emission direction 41 is established by two angles, which are indicated hereafter by a horizontal angle a and an elevation angle b, without being restricted to these. The moving swivel head 34 also moves light beam 40, by means of which at least one of the angles a, b changes in a predefined manner. Emission direction 41 changes and repeats itself by means of drive 35 in a predefined manner. Preferably emission direction 41 repeats at a fixed repeat rate, which is predefined, e.g., by a constant angular velocity of the rotating plate.

In one embodiment, light beam source 39 is arranged on swivel head 34 (FIG. 1). Furthermore, light beam 40 may be guided in an optical element 42. e.g., a light conductor. The exit aperture of optical element 42 is moved by swivel head 34. Another embodiment (FIGS. 5, 6) has arranged on swivel head 34 a beam splitter 42, a mirror or a similar optical element 42 for redirecting light beam 40. Light beam source 39, resting on tripod 33, couples light beam 40 into beam splitter 42. Illustrative beam splitter 42 emits light beam 40 in emission direction 41 inclined to axis 29. Elevation angle b of light beam 40 is constant. When rotating swivel head 34 about axis 29, light beam 40 also rotates about axis 29; horizontal angle a of light beam 40 changes at the same angular velocity as swivel head 34. Rotating light beam 40 describes a cone. On flat walls 3, point of light 8 runs along parabolic lines, which result from the intersection with the cone. Emission direction 41 of light beam 40 and the orientation of swivel head 34 do differ in the elevation angle b; however, since it is predefined unchangeably by base station 5, one can clearly calculate emission direction 41 from the orientation of swivel head 34 and vice versa. Emission direction 41 of light beam 40 and the orientation of swivel head 34 are used synonymously hereafter. Orientation is synonymous for emission direction 41 also in the case of dual-axis swivel heads.

Base station 5 also contains a distance measurement unit 43, which determines in a measuring direction 44 distance d of base 5 to wall 3. Distance measuring unit 43 is based for example on a combined duration and interference measurement of a measurement light beam 45, which emits in measuring direction 44 and receives its reflection from measuring device 44. Distance measuring unit 43 may contain its own light source, e.g., a laser diode. A modulation for the measuring light beam 45 may be imposed for example via the supply current of the laser diode. Distance measuring unit 43 can use light beam 40 of light beam source 39 and impose on it a frequency and/or amplitude modulation, for example by means of an electro-optical or acoustic-optical modulator, for the duration and interference measurement. A photo detector records a beat signal, which produces the interference of reflected measuring light beam 45 using a reference light beam. Distance measurement unit 43 determines from the beat signal the absolute path length, which the measuring light beam 45 has covered, ergo distance d. A measurement requires approximately 0.1 s to obtain sufficient measuring accuracy. Described distance measuring unit 43 is illustrative of other optical distance measurement units.

Measurement direction 44 is predefined by the orientation of swivel head 34. For example, measuring light beam 45 is coupled into beam splitter 42 on swivel head 34. Alternatively, distance measuring unit 43 may be arranged on swivel head 34. Measuring direction 44 changes while swivel head 34 rotates or swivels. In regard to the illustrative rotating plate, distance d of base station 5 can be determined for measuring directions 44 differing in horizontal angle a. In the example, measuring direction 44 is tilted relative to vertical axis 29 about the fixed elevation angle b. Elevation angle b is illustratively predefined by beam splitter 42. When swivel head 44 turns, measuring directions 34 describe a cone. Due to the clear geometric relationship between measuring direction 44 and the orientation of swivel head 34, both will be used synonymously hereafter.

In the depicted embodiments, light beam 40 and measuring light beam 45 are generated separately. Emission direction 41 and measuring direction 44 may thereby differ for example by a slight parallel offset. The difference is known in a structure-related manner and may be compensated for when calculating angles and distances. Light beam 40 and measuring light beam 45 may for example also be emitted in spatial directions that are clearly different from each other, e.g., in the opposite direction (not depicted). Swivel head 34 may be rotated in an additional orientation for compensation purposes so that emission direction 41 of light beam 40 coincides or is parallel to measuring direction 44 in the former orientation. This applies for every measuring direction 44 that base station 5 can assume. Also, all pairings from former orientations and additional orientations are known and stored. According to the pairings, a control procedure can also correct the orientation of measuring direction 44, for example for the distance measurements, to the associated orientation for light beam 40. In another embodiment, no separate light beam source 39 is provided for measuring light beam 45. Light beam 40 is coupled into distance measuring unit 43. Distance measuring unit 43 can impose a modulation on light beam 40 only for the distance measurements or continuously, in order to use said light beam as a measuring light beam 45. Light beam 40 and measuring light beam 45 are coaxial in this case. Since ultimately a coaxial arrangement of light beam 40 and measuring light beam 45 can be achieved or reproduced by appropriate measures, emission direction 41 and measuring direction 44 are hereafter assumed to be coincident.

Base station 5 is set up in the room in a freestanding manner. Light beam 40 or point of light 8 is to run over wall section 20, in which marker 7 is to be tracked. One shall hereby be mindful particularly of possible shadowing from other objects in the room. Base station 5 throws a permanently moving point of light 8 on wall 3. The movement sequence of light beam 40 is predefined by swivel head 34 and drive 35. Given the preferred embodiment of the rotating plate and a fixed rotating speed of drive 35, horizontal angle a changes at a fixed rate and repeats itself after one revolution. The line drawn by point of light 8 on wall 3 is dependent on the shape and orientation of wall 3.

The movement of light beam 40 and the recording of images 9 is synchronized by an allocation unit 46 so that for an image 9 that was recorded at a point in time, the associated emission direction 41 of light beam 40 can be determined.

A simple allocation unit 46 is based on a constant angular velocity of light beam 40 and clock generator 24 in mobile measuring station 6. Base station 5 rotates the rotating plate at a constant angular velocity. As soon as zero marking 38 of the rotating plate passes by encoder 36, i.e., light beam 40 points in zero direction 30, base station 5 transmits a synchronization signal via radio module 47. A counter 48 of mobile measuring station 6 is reset by the synchronization signal. Clock generator 24 triggers trigger 23 of camera 17 and increments counter 48. Horizontal angle a of emission direction 41 thus results from the product of the angular velocity and the time span measured by meter 48 since the last synchronization signal.

An illustrative allocation unit 46 uses a central clock generator 49, which transmits at consecutive points in time a trigger signal to encoder 36 and camera 17. The transmission of the trigger signal occurs preferably in a radio-based manner. Responding to the trigger signal, encoder 36 determines the orientation of swivel head 34 or emission direction 41 of light beam 40. Emission direction 41 is relayed to allocation unit 46. A first shift register 50, e.g., FIFO, of allocation unit 46 stores emission direction 41. Responding to the trigger signal, camera 17 actuates the recording of an image 9. The trigger signal rate specifies the recording rate of images 9. Clock generator 49 may be arranged in base station 5, mobile measuring station 6, or a separate control unit. Images 9 are stored in a second shift register 51 having the same length as first shift register 50. Image analysis unit 26 can also store, instead of images 9, image coordinates x1, y1 of imaged point of light 8 in second shift register 51. Emission direction 41 and images 9 are located in identically indexed storage locations of both shift registers 50, 51. The index represents the instant that image 9 was recorded. Upon request, allocation unit 46 outputs for example emission direction 41 and image coordinates x1, y1 of the oldest index and then deletes this index. The separated shift registers compensate for the fact that the storing and analyzing of image 9 typically takes longer than the reading by encoder 36. In addition, images 9 can thus be recorded before the analysis of previous images 9 is completed. Allocation unit 46 may also be used when the angular velocity of emission direction 41 changes.

Allocation unit 46 can also operate in an event-controlled manner. For example, mobile measuring station 6 records images 9 only when, for current emission direction 41, there is a measurement d in associated measuring direction 44. During an initialization phase, distance measurements are performed in multiple discrete measuring directions 44. Obtained distances d and associated measuring directions 44 are stored in a reference database 52. During the tracking phase, encoder 36 continually measures the orientation of swivel head 34. Allocation unit 46 compares current emission direction 41 against measuring directions 44 stored in reference database 52. When there is a match, allocation unit 46 actuates a trigger signal 44, to which trigger 23 of camera 17 records an image 9 in a responding manner. Current emission direction 41 or measuring direction 44 and distance d may be pushed into first shift register 50. Image analysis unit 26 determines coordinates x1, y1 of point of light 8 and writes these into the second shift register.

A rudimentary tracking phase will be described hereafter, which determines position 53 of a location 2 marked by marker 7 on wall 3 by means of the previously described mobile measuring station 6 and base station 5. Regarding the tracking method, it is assumed that the walls are flat and vertical. The user orients camera 17 of measuring station 6 horizontally, i.e., viewing direction 18 of camera 17 is in a horizontal plane. Furthermore, marked location 2 is within visual field 19 of camera 17, i.e., appears in every image 9 of camera 17. Base station 5 is set up at a distance to mobile measuring station 6 in the room.

Base station 5 rotates rotating plate at a constant angular velocity. Measuring station 6 continually records images 9 at a rate of 10 ms for example. A counter counts the number of recorded images 9 and is reset when base station 5 emits a synchronization signal associated with a zero direction 30 of light beam 40. When image analysis unit 26 detects point of light 8 imaged on an image point P in current image 9, the counter value is recorded. The counter value thus corresponds to instant t at which image 9 is recorded.

Figure 9:
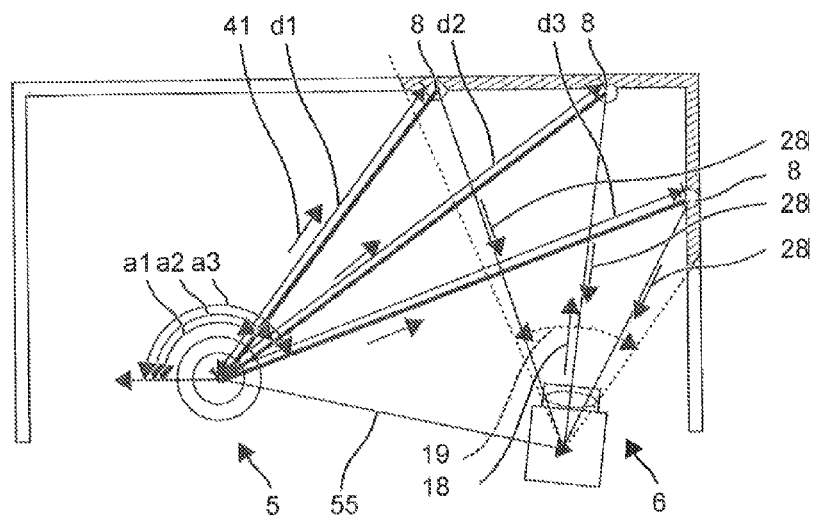
FIG. 9 shows an interior space with a tracking system.

Image analysis unit 26 determines image coordinates x1, y1 of image point P on which point of light 8 is imaged in image 9. In the same image 9, image analysis unit 26 also determines image point S and its image coordinates x0, y0 on which marked location 2 is imaged. Image coordinates x0, y0 associated with marked location 2 can also be determined in a separate image 9, whereby both images 9 must be taken in the same viewing direction 18. Image analysis unit 26 determines distance r between image point P of imaged point of light 8 and image point S of marked location 2 in FIG. 9 (e.g., r=|x1−x0, y1−y0|). If distance r falls below a threshold value, i.e., the image points P, S are near and thus also the real point of light is near the marked location 2 on wall 3, image 9 is selected for further processing. Otherwise, image 9 is discarded, and images 9 are recorded again until in an image 9 distance r is less than the threshold value. For vertical walls 3 and light beam 40 revolving only about vertical axis 29, only horizontal distance d=x1−x0 of image points P, S is relevant for the threshold value.

The counter value or timespan t determined as a product of the counter value with the clock is relayed to base station 5. Allocation unit 46 of base station 5 calculates from instant t the orientation, i.e., horizontal angle a, of swivel head 34 for zero direction 30 based on the fixed angular velocity. Emission direction 41 of light beam 40 specified by the orientation of swivel head 34 is assigned to imaged point of light 8.

Figure 7:
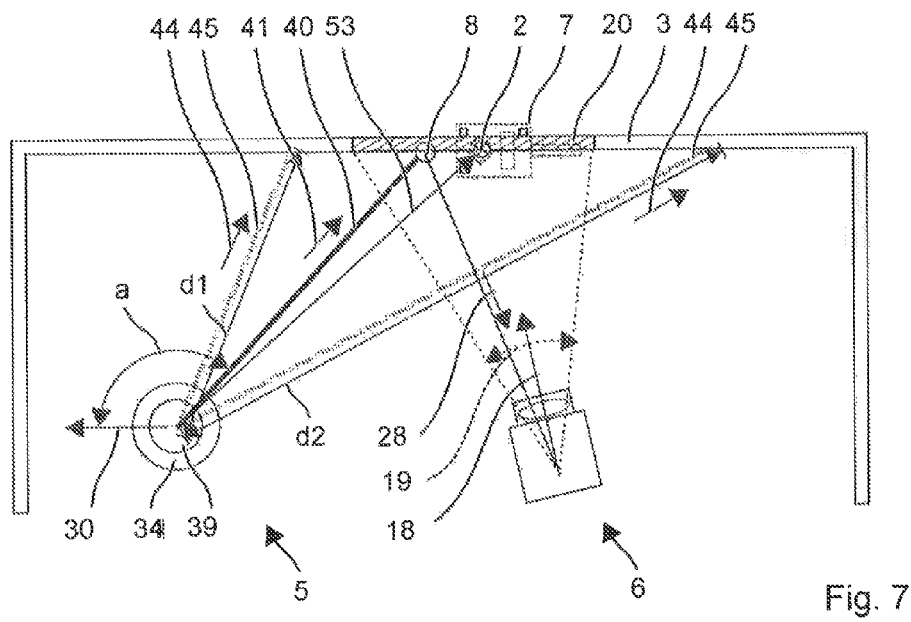
FIG. 7 shows an interior space with a tracking system associated with the image in FIG. 4.

Allocation unit 46 determines distance d of base station 5 to wall 3 in emission direction 41. Allocation unit 46 accesses a reference database 52, in which are stored distances d of base station 5 from wall 3 for multiple measuring directions 44. Reference database 52 is preferably loaded with corresponding distance measurements in an initialization phase directly after setting up base station 5. For example, allocation unit 46 searches in reference database 52 for measuring direction 44 with the smallest deviation to emission direction 41 and adopts its allocated distance d. Alternatively, one can select measuring direction 44 proximate to emission direction 41 (FIG. 7). Distance d for emission direction 41 is interpolated from distances d1, d2 of the proximate measuring directions 44. For the assumed flat and vertical walls 3, two measuring directions 44 with differing horizontal angles a already result in a sufficiently high level of accuracy for distance d given emission direction 41. Measuring direction 44 may lie outside of visual field 19 of mobile measuring station 6.

The coordinates of point of light 8 in base coordinate system 15 are clearly determined by distance d and emission direction 41 from horizontal angle a and fixed elevation angle b for the illustrative setup. Since point of light 8 is near the marked location 2, at least in relation to horizontal angle a, distance d and at least horizontal angle a of point of light 8 are adopted for marked location 2. Elevation angle b for marked location 2 can be calculated without additional measurement for vertical walls based on the vertical image coordinate y1, horizontal angle a, distance d and fixed elevation angle b of light beam 40. The determined coordinates of marked location 2 are displayed for practical purposes to the user in Cartesian coordinates common in the construction industry.

Hereafter, an advantageous tracking phase of marked location 2 on wall 3 is described, which is presented in an abbreviated manner, if analogous method steps are already described in the context of the rudimentary tracking phase. The walls are again assumed to be vertical and largely flat. Base station 5 rotates light beam 40 at a constant angular velocity about vertical axis 29. Mobile measuring station 6 is synchronized with the revolution of light beam 40, for example by means of the synchronization signal.

Figure 8:
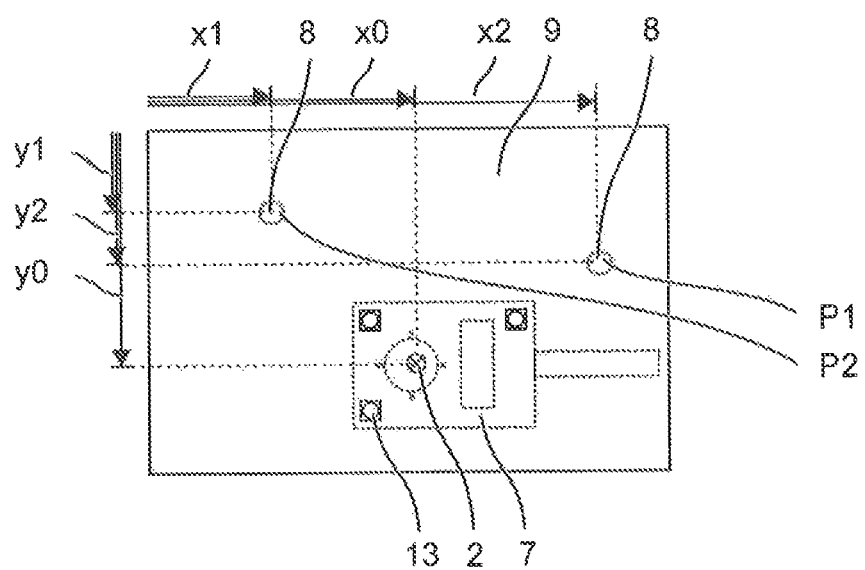
FIG. 8 shows two superimposed images of a series.

Camera 17 records point of light 8 at two different locations on wall 3. Viewing direction 18 of camera 17 thereby remains unchanged. Camera 17 can record multiple images 9 for example with a short exposure time. The exposure time lies in the area of 1 ms to obtain a good signal-to-noise ratio with the strongly localized and bright point of light 8 in comparison to the diffused ambient light. Trigger 23 captures for every image 9 the instant at which image 9 is recorded. Among images 9, image analysis unit 26 searches for a first image 9, in which point of light 8 is imaged on a first image point P1. Instant t1 of when image 9 is recorded is allocated to image point P1. Image analysis unit 26 searches among images 9 for a second image 9, in which point of light 8 is imaged on a second image point P2. Second image point P2 is to differ from first image point P1. Otherwise, image analysis unit 26 searches for another suitable second image 9. Instant t2 of when second image 9 is recorded is allocated to second image point P2. Recording images 9 by camera 17 and searching for an image 9 with point of light 8 may occur sequentially or in parallel. FIG. 8 depicts first image 9 and second image 9 superimposed in an illustration.

Camera 17 can also record images 9 until image analysis unit 26 detects in image 9 the point of light 8 imaged on a first image point P1. Camera 17 exposes image 9 a second time within a short time span, by means of which point of light 8 is imaged on a second image point. The time span is a correspondingly small fraction of the revolution period of swivel head 34 so that point of light 8 remains within visual field 19 of camera 17. Camera 17 can also use an exposure period that corresponds approximately to the aforementioned time span. Point of light 8 draws a line in image 9, whose end points correspond to aforementioned image points P1, P2. The second instant t2 is thereby allocated to the end of the exposure period.

Image analysis unit 26 determines image coordinates x1, y1 of first image point P1 and image coordinates x2, y2 of second image point P2. Furthermore, for image point S, one determines image coordinates x0, y0 on which marked location 2 is imaged in image 9. Relative position r (rx, ry) of marked location 2 in relation to projected points of light 8 can be determined (e.g., rx=x0−x1/x2−x1). Given a largely flat wall 3, the relative position of image points P1, P2 to S in image 9 is equal to the relative positions of point of light 8 to marked location 2 on wall 3.

For the two instants t1, t2, allocation unit 46 determines the respective emission direction 41 of light beam 40 and distance d of wall 3 in emission directions 41, ergo the absolute positions of point of light 8 in base coordinate system 15 at instants t1, t2. The relative position of marked location 2 can be converted into an absolute position using the absolute positions of point of light 8. The calculated position is displayed to the user.

Mobile measuring station 6 records images 9 preferably in an event-controlled manner. Mobile measuring station 6 optimizes the recording of images 9 to the extent that at a first instant t1, point of light 8 is imaged at the left edge of image 9 and at a second instant t2, point of light 8 is imaged at the right edge. Camera 17 initially records images 9 at any given points in time until point of light 8 is imaged in a first image 9. Instant t0 for this image 9 is captured. Within the known period of revolution T of swivel head 34, base station 5 will orient light beam 40 back in the same emission direction 41. Mobile measuring station 6 records the next images after captured instant t1 at a time interval that is somewhat less than period of revolution T. In image 9, the next imaged point of light 8 shifts to the right or left edge. Instant t0 can be adapted iteratively multiple times until point of light 8 appears at a desired distance to the image edge, e.g., a distance to the edge less than 20% of the image width. First image 9 is recorded and the associated instant t1 is captured. The recorded point of light 8 may be shifted to the other image edge, by images being recorded after first instant t1 at a time interval that is larger than period of revolution T. The instant is iteratively adapted multiple times until point of light 8 is imaged at the desired distance to the other image edge. Second image 9 is recorded and the associated instant t2 is captured. Based on instants t1, t2 at which point of light 8 is imaged on image points P1, P2, on the left or right edge of image 9, allocation unit 46 then determines the corresponding emission directions 41 under which point of light 8 is imaged on wall 3 at instants t1, t2 from base station 5.

Distances d in certain measuring directions 44 are measured preferably during an initialization phase and stored in reference database 52. The initialization phase is carried out for example directly after base station 5 is set up at a new location. In addition, the initialization phase may be repeated at regular intervals or prompted manually by the user.

During the initialization phase, swivel head 34 is preferably rotated or swiveled with the same process as in the tracking phase. Illustrative swivel head 34 rotates solely and completely about vertical axis 29. However, swivel head 34 is moved more slowly than in the tracking phase.

The orientation of swivel head 34 is changed for example incrementally in increments from 0.5 to 2 degrees. Swivel head 34 can be stopped after every increment. Distance measuring unit 43 measures distance d to wall 3 in discrete measuring directions 44, which result from orienting swivel head 34. Alternatively, swivel head 34 is moved slowly, e.g., its angular velocity is less than 10 degrees per second. Distance measuring unit 43 measures distance d to wall 3 in predefined time intervals, thereby at discrete measuring directions 44. The orientations are determined in both variants preferably by encoder 36. For the orientations, allocation unit 46 determines measuring directions 44 and stores these along with measured distances d in reference database 52. Since measuring the distance is time-consuming, each orientation is initiated preferably only one time for a distance measurement. The initialization phase ends for example after one revolution of light beam 40 about axis 29.

The angular velocity during the initialization phase is less than 0.2 Hz. The measuring period of the optical distance measuring devices for distances ranging between 2 m and 50 m is technically limited. Tracking system 1 switches over into the tracking phase after the initialization phase. The angular velocity of swivel head 34 is significantly increased. During the tracking phase, swivel head 34 rotates about its axis 29 at more than 10 Hz. The high angular velocity is particularly necessary when mobile measuring station 6 is hand-controlled.

The initialization phase can be repeated on a regular basis. In addition, the tracking phase can be interrupted.

Another method provides that the user or mobile measuring station 6 specifically requests a distance measurement to a measuring direction 44. To that end, base station 5 switches into the initialization phase. Swivel head 34 is rotated and encoder 36 emits a trigger signal when measuring direction 44 is reached. Measuring light beam 45 is transmitted in measuring direction 44 for distance measuring purposes. Measured distance d is stored in reference database 52. The effort for such an individual measurement is comparatively high. First, swivel head 34 must be decelerated to the lower angular velocity and one must wait until the optical system has settled down. Furthermore, starting up a specific measuring direction 44 is more time-consuming than measuring the values of an existing measuring direction 44 by means of encoder 36.

The initialization phase can also be entirely omitted. For example, a floorplan of the interior space is stored in a database 54. The user positions base station 5 at a location and aligns the zero direction 30 of base station 5. The location and zero direction 30 are entered into base station 5. Allocation unit 46 measures the distances in the floorplan along emission directions 41 and stores these in reference database 52 for the tracking phase. The initialization phase functions only for existing floorplans and when there is sufficient correlation of the floorplan to the actual interior space.

A tracking phase provides for determining the absolute position 55 of mobile measuring station 6 in the interior space. The absolute position is indicated by vector 55 from base station 5 to mobile measuring station 6. The tracking phase is based on detecting point of light 8 at at least three different locations 2 on wall 3, yet under the same viewing direction 18 of mobile measuring station 6. The following explanations refer to flat, vertical walls to simplify the description. However, the tracking method does not require this; the walls may be inclined in any manner in relation to the vertical direction.

Illustrative base station 5 rotates rotating plate 34 at a constant angular velocity about vertical axis 29. Emission direction 41 of light beam 40 changes at a constant repetition rate. Horizontal angle a changes with the angular velocity; elevation angle b remains constant.

Figure 10:
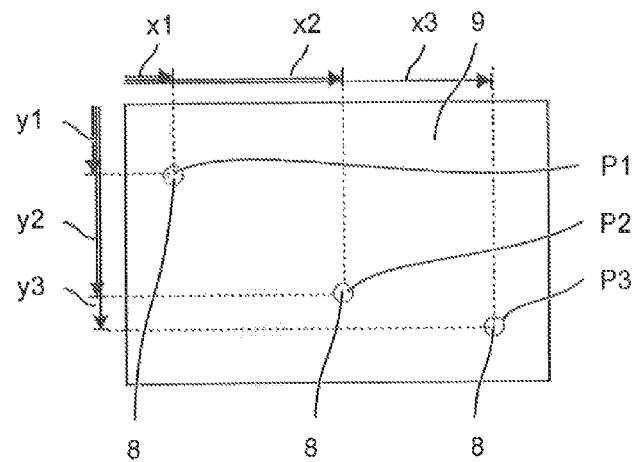
FIG. 10 shows three superimposed images of a series for the interior space of FIG. 9.

Mobile measuring station 6 is arranged for example on a tripod 16 in a horizontally oriented manner. Camera 17 detects point of light 8 at three different image points P1, P2, P3, i.e., under three different recording directions 28 given the same viewing direction 18. The series of three images 9 is depicted in FIG. 10 superimposed in an image 9. Images 9 can also be recorded in one image 9 by multiple exposure, ergo the series is only one image 9. The series is characterized by uniform viewing angle 18 and the fact that point of light 8 is imaged; the series does not necessarily comprise more than one image 9.

Mobile measuring station 6 triggers preferably the recording of images 9 in an event-controlled manner in order to detect the three image points P1, P2, P3 on which point of light 8 is imaged, preferably in a broadly distributed manner to each other across visual field 19. Mobile measuring station 6 can for example iteratively adjust the time interval between sequentially recorded images 9 until point of light 8 is imaged on image points P1, P3 on opposite edges of image 9 and on an image point P2 near the center of image 9. The recording of images 9 can also be limited to instants at which emission direction 41 matches a measuring direction 44 stored in reference database 52. A corresponding trigger signal may be sent out from base station 5. This is particularly advantageous if the walls are not flat, e.g., due to projecting attachments, such as a sink.

Mobile measuring station 6 captures respective instants t1, t2, t3 at which point of light 8 is imaged on image points P1, P2, P3. Allocation unit 46 determines emission direction 41 of the three instants t1, t2, t3. In the example illustrated, emission direction 41 has an increasing horizontal angle a1, a2, a3 to the consecutive image points P1, P2, P3. Furthermore, allocation unit 46 determines distance d1, d2, d3 of base station 5 to wall 3 in the respective emission directions 41, for example by referring to reference database 52. Coordinates K1(a1,d1); K2(a2, d2); K3(a3, d3) of points of light 8 on wall 3 are now known in relation to base station 5 and are clearly allocated to image points P1(x1,y1); P2(x2, y2); P3(x3, y3). The relative position of camera 17 or mobile measuring station 6 to base station 5, i.e., vector 55, can be clearly determined at least for the horizontal plane. For example, vector 55 can be calculated based on trigonometric relationships.

The precision of the position of camera 17 is to be demonstrated with the following idea. Distance d of two points of light 8 on wall 3 is applied to a defined distance d of associated image points P1, P2. Defined distance d depends on two variables; distance 22 of camera 17 to wall 3 and viewing direction 18 to wall 3. Accordingly, two pairs of points of light 8 are sufficient to determine both variables, i.e., distance 22 and viewing direction 18. The two pairs can share a point of light 8. If camera 17 is not necessarily oriented in a horizontal manner, a fourth point of light 8 is necessary for a third pair of points of light 8 to determine the vertical orientation of camera 17. The four image points may thereby not lie on one line.

Figure 11:
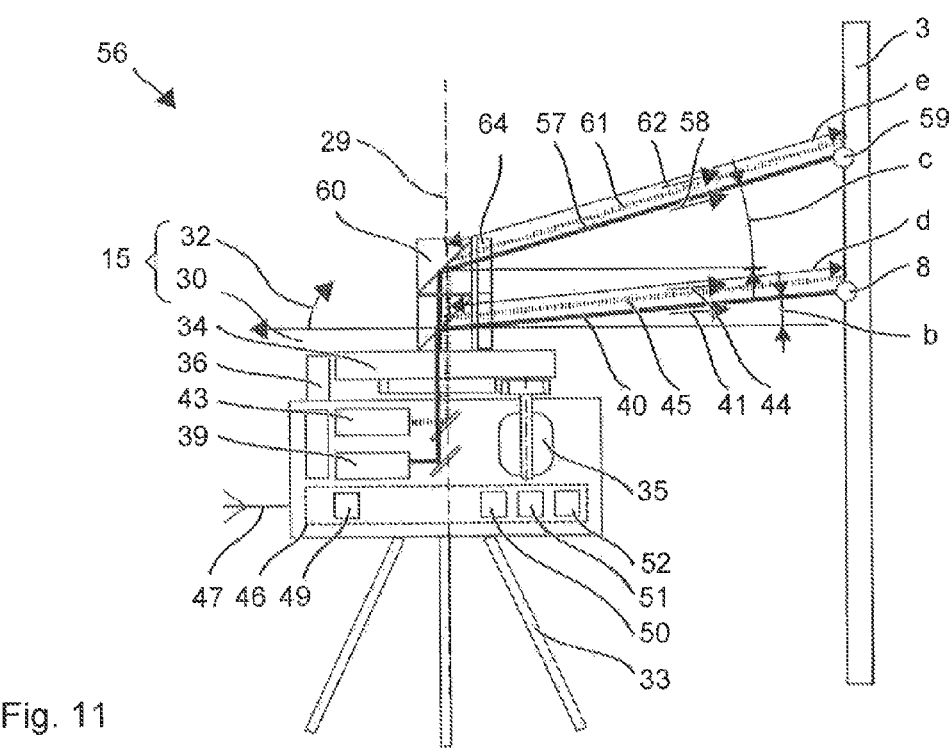
FIGS. 11 and 12 show a base station.

FIG. 11 depicts an enhanced base station 56. Base station 56 adopts all characteristics of the previously described base station 5, particularly of the elements provided in FIGS. 5 and 11 with the same reference signs.

Swivel head 34 can be rotated or swiveled preferably only about vertical axis 29.

Base station 56 emits a bundle of two light beams 40, 57 in different emission directions 41, 58. Emission directions 41, 58 differ preferably in elevation angle b, c. Alternatively, the two light beams 40, 57 may be parallel and be more than 20 cm apart along vertical axis 29. First light beam 40 generates a first point of light 8 on wall 3 and second light beam 57 generates a second point of light 59 on wall 3. First point of light 8 is offset in a vertical direction to second point of light 59. The two light beams 40, 57 are preferably generated by the same light beam source 39. A beam splitter 60 splits a light beam into two light beams 40, 57.

Base station 56 also generates two measuring light beams 45, 61. First measuring light beam 45 is emitted in a measuring direction 44 and received from it, which is preferably equal to emission direction 41 of first light beam 40. Emission direction 41 of light beam 40 and measuring direction 44 of measuring light beam 45 can be offset by a constant angle, e.g., horizontal angle a. The swivel body may be rotated, swiveled about the angle so as to also emit a light beam 40 in every measuring direction 44. Emission direction 41 and measuring direction 44 can have a small offset insofar as the associated measuring error can be tolerated. Second measuring light beam 61 behaves in relation to the second light beam 57 like the first measuring light beam 45 to the first light beam 40. Second measuring direction 62 preferably has elevation angle c. Distance d in first measuring direction 44 is typically different from distance e in second measuring direction 62.

Base station 56 may have a switchable shutter 64, which is preferably arranged downstream from beam splitter 60. Switchable shutter 64 can independently block first measuring light beam 45 and second measuring light beam 61. Illustrative shutter 64 may have two mechanically pivotable flaps. A preferred embodiment uses individually darkenable glass platelets, based on liquid crystal displays. Switchable shutter 64 allows one to measure distances with a single distance measuring unit 43. During a distance measuring procedure, only one of the glass platelets becomes transparent each time by means of a switching pulse in order to send out only one measuring light beam 45 and to block the other measuring light beam(s) 61. The distance measurements are performed during the initialization phase. Swivel head 34 moves measuring light beams 45, 61 at a low angular velocity about vertical axis 29. For example, upper measuring light beam 61 is blocked during the first revolution, and lower measuring light beam 45 is blocked during the second revolution. Shutter 64 can change the transparent glass platelet for example when the synchronization signal is generated by zero direction 30 passing through encoder 36.

Shutter 64 can also be used to temporarily block one or more light beams 40, 57. During the tracking method, initially all glass platelets are preferably transparent, i.e., all light beams 40, 57 are emitted on to wall 3 and generate multiple points of light 8, 59 offset to each other. Upon detecting a point of light 8, 59 in image 9, mobile measuring station 6 can request that one or more light beams 40, 57 be blocked to detect light beam 40 associated with projected point of light 8. For example, another image 9 is recorded after exactly one period of revolution of swivel head 34 and a check is performed as to whether point of light 8 is still imaged in image 9. Points of light 8 associated with darkened light beams 40 are no longer visible in the rest of image 9.

Depicted base station 56 has exactly two light beams 40, 57 and two measuring light beams 45, 61. The number of light beams 40, 57 and measuring light beams 45, 61 is the same, yet not limited to two; up to eight light beams 40 with various elevation angles b, c are reasonable. The beam splitter 60 represents a simple variant to generate light beams 40 and measuring light beams 45 of a light beam source 39 and a distance measuring unit 43; alternatively, multiple light beam sources and multiple distance measuring units can also be used.

Figure 12:
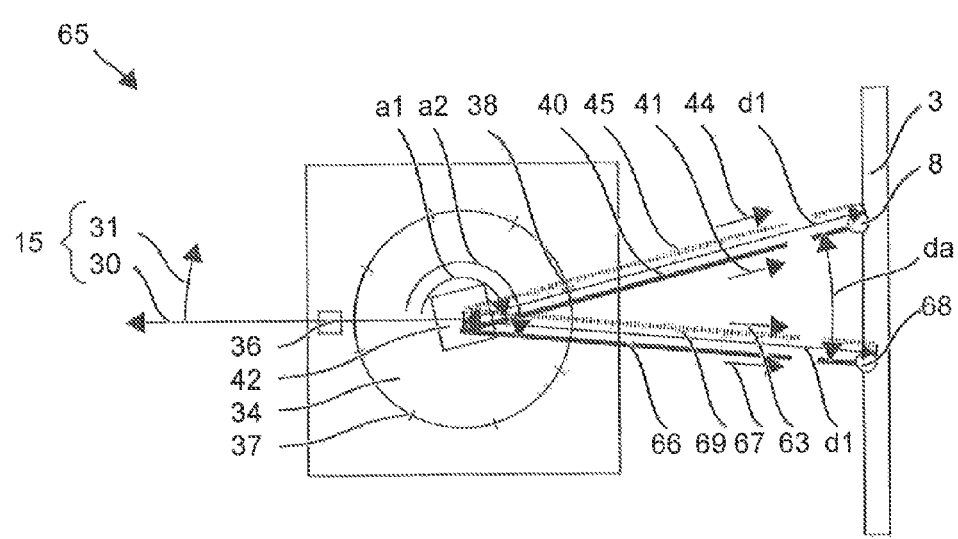
Figure 13:
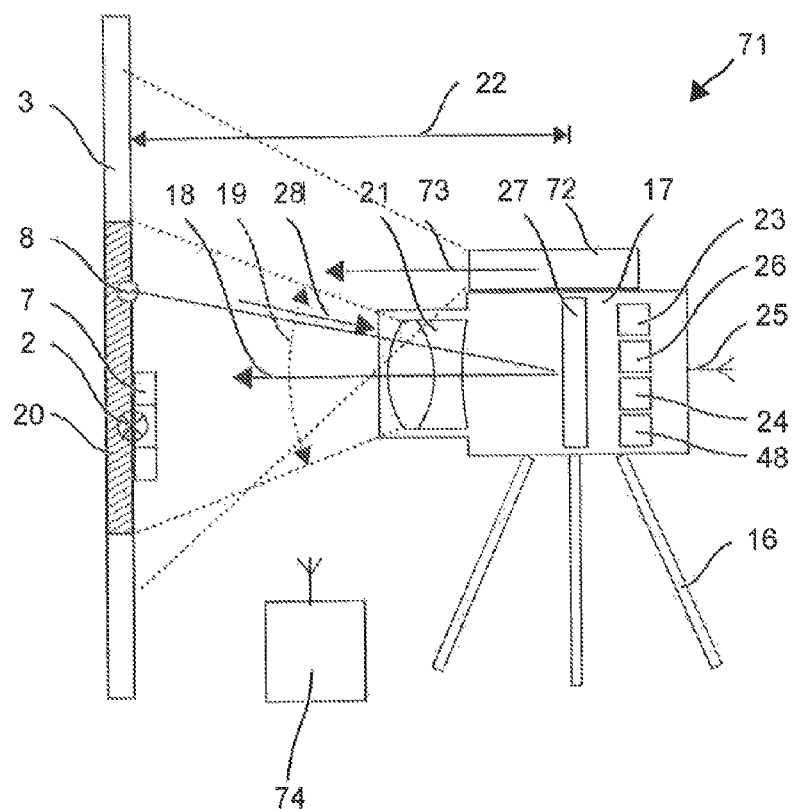
FIG. 13 shows a mobile measuring station.

FIG. 12 depicts an enhanced base station 65. Base station 65 adopts all features of the previously described base station 5, particularly the elements provided in FIGS. 5 and 11 with the same reference signs. Base station 65 may also be combined with base station 56.

Swivel head 34 can be preferably rotated or swiveled only about vertical axis 29.

Base station 65 can simultaneously emit a bundle having two light beams 40, 66 in different emission directions 41, 67, which differ at least in horizontal angle a. Angle difference da of emission directions 41, 67 is constant; in this way, if first emission direction 41 is known, the second emission direction 67 can be clearly determined and vice versa. Base station 65 thus generates a first point of light 8 and, offset to that in a horizontal direction, a second point of light 68 on wall 3. Angle difference da is preferably selected in such a manner that for a typical setup of base station 65 and mobile measuring station 6, both points of light 8, 68 are projected simultaneously in image 9. Angle difference da lies preferably in a range between 50% and 80% of the horizontal angle of visual field 19.

Base station 65 has a first measuring light beam 45, which transmits in a first measuring direction 44 and is preferably received from it. First measuring direction 44 is allocated to first emission direction 41; preferably, these are collinear. Emission direction 41 and measuring direction 44 may also differ by a constant angle; swivel head 34 may be moved about the angle to emit a light beam 40 in every measuring direction 44.

If both emission directions 41, 67 have the same elevation angle b, a second measuring light beam 69 may be omitted. Swivel head 34 is simply rotated about the angle da difference to perform a distance measurement in measuring direction 63 allocated to second emission direction 67. When using two or more measuring light beams 45, 69, a switchable shutter 64 is provided. The switchable shutter allows exactly one measuring light beam 45 to pass through and blocks the other measuring light beams 69. By means of control pulses, one can select which measuring light beam 45, 69 passes through.

During the tracking phase, mobile measuring station 6 can already detect at one point in time two points of light 8, 68 at various image points P1, P2. Initially, camera 17 will usually image only one of the two points of light 8 in the image. The next images may be recorded at a time interval that is shorter than period of revolution T. Point of light 8 thereby migrates in the image to an image edge. If second point of light 68 does not appear before first point of light 8 leaves the image, the time interval is increased to a value greater than period of revolution T. First point of light 8 migrates to the other edge; second point of light 68 should now appear in the image. Image 9 is recorded at instant t; simultaneously, first point of light 8 is imaged on first image point P1 and second point of light 68 is imaged on second image point P2.

Emission directions 41, 67 are allocated based on single instant t at which image 9 was recorded. Allocation unit 46 determines the associated emission direction 41, e.g., horizontal angle a1, for first light beam 40 at instant t. Second emission direction 67 of second light beam 66 is calculated by adding the known and constant angle difference da to first emission direction 41, e.g., a2=a1+da.

By reading reference database 52, allocation unit 46 determines distances d1, d2 associated with first emission direction 41 or second emission direction 67.

Evaluation unit 70 then determines vector 55 from base station 56 to mobile measuring station 6.

Mobile measuring station 71 may have a projector 72. Mobile measuring station 71 adopts all features of the previously described mobile measuring station 6, particularly the elements depicted in FIG. 3. Mobile measuring station 71 determines its position 55 and viewing direction 18 according to one of the previously described tracking methods.

Projector 72 is a non-removable unit with camera 17. Correspondingly, the position and projection direction 73 of projector 72 in relation to camera 17 is known. Preferably, projection direction 73 and viewing direction 18 are parallel to each other. Projector 72 projects the floorplan on wall 3. Mobile measuring station 71 communicates via its radio interface 25 with database 74, in which the floorplan is stored. Mobile measuring station 71 transmits its position 55 and its viewing direction 18. The database calculates the section and rotation of the floorplan to be depicted for projection direction 73, and forwards the image data of the floorplan to mobile measuring station 71. For example, the floor plan may indicate at which location pipes, anchors, through-holes, etc. are to be arranged in wall 3. The user can compare the projected floorplan against the actual wall 3.

The invention claimed is:

1. A tracking method for determining a position of a marked location on a wall of an interior space, comprising the steps of:

recording the marked location in a first image with a camera, oriented in a viewing direction, of a mobile measuring station;

determining image coordinates of a first image point on which the marked location is imaged in the first image;

repeated turning or swiveling of a bundle intrinsically having at least one light beam about an axis of a base station according to a predefined sequence of changing emission directions for generating a migrating pattern of points of light on the wall of the interior space;

recording a series of images of the wall of the interior space under the viewing direction, wherein in the series, one of the migrating points of light is imaged on at least a second image point;

determining image coordinates of at least three different image points;

determining the emission directions of the light beams, whose points of light are imaged at a point in time in one of the images on at least one second image point, based on instants at which the respective image is recorded;

determining a distance of the axis of the base station to the wall in the emission directions based on distance measurements to the wall stored in a reference database in measuring directions going out from the base station; and determining the position of the marked location based on the image coordinates of the first image point, the image coordinates of the second image point, the emission direction associated with the second image point, and the respective distances of the axis of the base station to the wall in the associated emission direction.

2. The tracking method according to claim 1, wherein the series of second images of the wall is imaged on at least two different image points of one of the migrating points of light, and the position of the marked location is determined based on at least two different image points, the different emission directions associated with the image points, and the respective distances.

3. The tracking method according to claim 1, wherein a first image from the series is recorded at a first instant and a second image from the series is recorded at a second instant that is different from the first instant.

4. The tracking method according to claim 3, wherein the first instant is adaptively adjusted to image one of the points of light of the migrating pattern on an image point on one edge of the image and wherein the second instant is adaptively adjusted to image one of the points of light of the migrating pattern on an image point on another edge of the image.

5. The tracking method according to claim 1, wherein:

during an initialization phase, a measuring light beam is rotated or swiveled about at least one axis in measuring directions changed according to a predefined sequence, the respective distance of the axis to the wall in the measuring directions is measured based on a duration and/or interference measurement of the measuring light beam and the measuring directions and associated measured distances (d) are stored in the reference database; and during a tracking phase, the distance is determined in an emission direction of the light beam by means of a measuring direction, matching the emission direction, in the reference database or a mean value of the stored distances weighted according to the respective differences of the stored measuring directions to the emission direction.

6. The tracking method according to claim 5, wherein during the initialization phase, the measuring light beam is rotated or swiveled at a first angular velocity and during the tracking phase, the bundle of light rays is rotated or swiveled at a second angular velocity, wherein the second angular velocity is greater than the first angular velocity.

7. The tracking method according to claim 6, wherein the sequence according to which the bundle with at least one light beam is rotated or swiveled is identical to the sequence according to which the measuring light beam is rotated or swiveled.

8. The tracking method according to claim 1, wherein the bundle is rotated or swiveled about exactly one axis and the bundle has at least two light beams, which are inclined towards each other about an angle in a plane containing the axis.

9. The tracking method according to claim 1, wherein the bundle consists of exactly one light beam.

10. The tracking method according to claim 1, wherein the marked location on the wall is marked by an optical position mark.

11. A tracking system for determining a position of a location on a wall, comprising:
a marker for marking the location on the wall;
a base station;
a mobile measuring station;
wherein the base station has a tripod, a swivel head that is seated on the tripod such that the swivel head is rotatable or swivelable about an axis, a light beam source that puts out a bundle of light beams in emission directions dependent on an orientation of the swivel head onto the wall for generating a pattern of points of light on the wall, a drive that changes the orientation of swivel head for continually moving the pattern of points of light on the wall, an encoder that determines the orientation captured of the swivel head at a point in time;
wherein the mobile measuring station has a trigger and a camera that records at instants controlled by the trigger a series of images of the wall under a viewing direction, an image analysis unit that determines image coordinates of the marked location imaged on an image point in the images and image coordinates of the point of light imaged on image points;
a reference database in which distance measurements to the wall in measuring directions going out from the base station are stored;
an allocation unit which allocates to the image points and based on the instant at which the respective image is recorded the respective emission direction of the light beam, and which allocates to the distance of the axis of the base station to the wall in the emission directions the measuring directions originating from the base station based on the distance measurements to the wall stored in the reference database; and
an analysis unit that determines the position of the marked location based on the image coordinates of the first image point, the image coordinates of the second image point, the emission direction associated with the second image points, and the respective distances of the axis of the base station to the wall in the associated emission direction.

12. The tracking system according to claim 11, wherein the base station has a distance measuring unit which puts out a measuring light beam for determining a distance from the axis in a measuring direction and wherein the emission direction is dependent on the orientation of the swivel head.

13. The tracking system according to claim 11, wherein the swivel head rotates only about a vertical axis and a beam splitter generates a bundle of multiple light beams with varying elevation angles.

* * * * *